United States Patent [19]

Challet et al.

[11] Patent Number: 4,758,453
[45] Date of Patent: Jul. 19, 1988

[54] TEXTILE SUBSTRATE FOR BIO-TRANSFORMATION AND PHASE SEPARATION

[76] Inventors: Paul Challet, "Le Courtil", Nuaille, 49340 Trementines; Patrice Brochard, 24 Boulevard Victor Hugo, 49300 Cholet; Jacques Cailleton, Route de Cholet, 49360 Maulevrier; Jean P. Dautais, 73 Rue Jean Mermoz, 44340 Bouguenais, all of France

[21] Appl. No.: 914,083

[22] Filed: Sep. 30, 1986

[30] Foreign Application Priority Data

Oct. 1, 1985 [FR] France ............................ 85 14518

[51] Int. Cl.⁴ .................................................. C02C 1/04
[52] U.S. Cl. .......................................... 428/36; 428/91;
428/95; 428/131; 428/136; 428/137; 428/155;
428/194; 428/906; 210/17; 210/150
[58] Field of Search ................ 428/95, 131, 136, 137,
428/155, 91, 36, 174, 906; 210/17, 150

[56] References Cited

U.S. PATENT DOCUMENTS 3,764,450 10/1973 Tesch .................................. 428/131
4,090,965 5/1978 Fuchs .................................. 210/151
4,165,281 8/1979 Kuriyama et al. ...................... 210/17

Primary Examiner—Marion C. McCamish
Attorney, Agent, or Firm—Young & Thompson

[57] ABSTRACT

A textile substrate is intended to serve as a support for bio-transformations and phase separations.

The manufacturing method consists in: making filaments from fibers; forming a substructure in the form of a continuous cloth; forming a fleece of fibers on one side of said cloth. The cloth is manufactured in such a way as to develop within it a transverse heterogeneity of a kind to confer on said cloth a tendency to roll up on itself, the structural configuration of the support is determined by an operation to cut a plurality of slits repeated in the direction in which the cloth is manufactured.

9 Claims, 2 Drawing Sheets

FIG.4A   FIG.4B   FIG.5
FIG.6
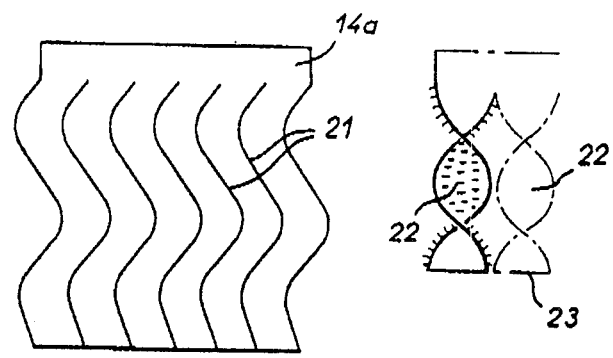
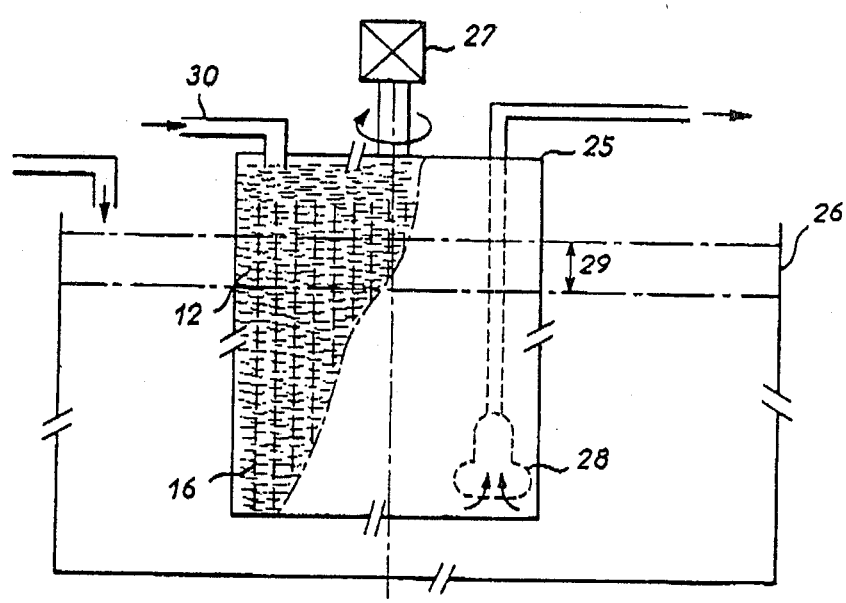

TEXTILE SUBSTRATE FOR BIO-TRANSFORMATION AND PHASE SEPARATION

The present invention concerns a textile substrate and its method of manufacture. The textile substrate is particularly intended to serve as a support for bio-transformations and phase separations.

The use of textile, especially synthetic fibers as a culture substrate is already known. These culture substrates are in the form of textiles with a fleece on one side. This fleece accommodates nutrient materials intended to permit the growth of living cells or plants inserted into this medium and the culture substrate thus forms a growth support for these living cells or plants.

The shaping of such culture substrates necessitates relatively long and expensive manufacturing operations.

It is already known to produce supports with the objective of fixing micro-organisms, molecules, metals, etc that are active when they are placed in a fluid to be processed. These living cells, molecules and metals will be hereinafter referred to as fixed constituents.

The supports produced until now are solid supports when tend to become clogged through the accumulation within them of elements from the fluid medium cooperating with the fixed constituents.

The solid supports produced until now are designed to feature the greatest possible porosity so as to provide fixing sites for the constituents that they contain, but they are difficult and expensive to unclog.

An object of the present invention is to alleviate these various disadvantages by means of a method of manufacturing textile substrates adapted to yield with a minimum number of operations directly usable support structures.

Another object of the invention is to provide in the textile substrates obtained a network of openings of a kind to reduce the risk of clogging and to facilitate unclogging as and when needed.

A further object of the present invention is to create a textile substrate forming an active support and which does not have the disadvantages of culture supports.

To this end the present invention concerns a method of manufacturing a textile substrate intended to serve as a support for bio-transformations and phase separations comprising the following steps:
producing filaments from fibers,
forming a substrate in the form of a continuous cloth,
forming a fleece of fibers on one side of said cloth, characterized in that the cloth is manufactured in such a way as to develop within it a transverse heterogeneity of a kind to confer on said cloth a tendency to roll up on itself, the configuration of the support structure is determined by an operation to cut a plurality of slits repeated in the direction of manufacture of the cloth.

The present invention also consists in a textile substrate comprising a substructure forming a continuous cloth and a fleece on one of its sides characterized by a plurality of slits each determining opening areas bordered by active areas in which the substructure is rolled up on itself with the fleece facing outwards.

It is thus possible to achieve by means of simple, fast and economical cutting operations various configurations of textile substrate structures particularly well suited to forming supports for bio-transformations and phase separation operations.

These textile substrates also have the advantage of taking up little space when they are not in use, which facilitates and makes less expensive their transportation.

Other objects, characteristics and advantages of the invention will emerge from the following description given by way of example and with reference to the appended drawings, in which.

Figure 2A:
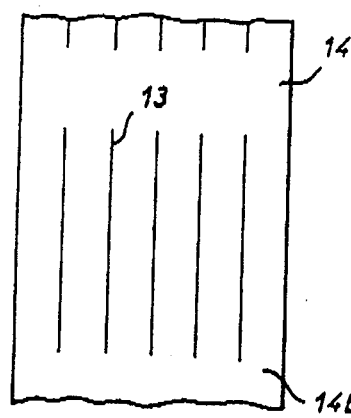
FIG. 2a is a plane view of a textile substrate in accordance with the invention showing the textile cutting stage.
Figure 2B:
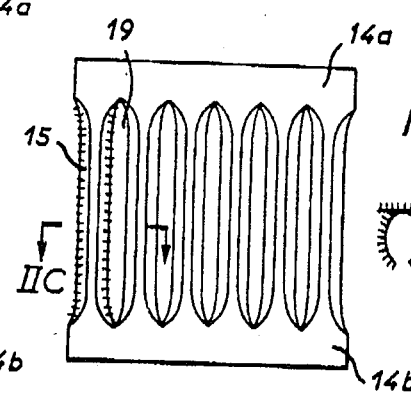
FIG. 2b is a view analogous to FIG. 2a showing the textile rolling stage.

FIGS. 4a and 4b and views analogous to FIGS. 2a and 2b and respectively showing further ways of cutting and rolling;

FIG. 5 is a schematic representation of a shearing method;

FIG. 6 shows one application of the textile substrates.

Figure 1:
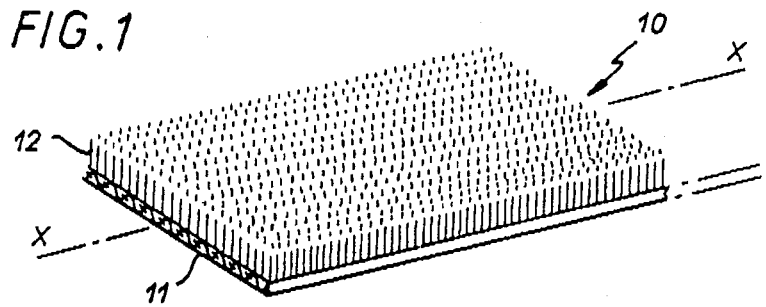
FIG. 1 is a perspective view showing a textile substrate in accordance with the invention prior to the cutting stage.

In the embodiment shown in FIGS. 1 through 2b the textile substrate 1 comprises a substructure 11 and a fleece 12.

The fibers used to produce the substructure 11 are of polypropylene. They typically have a diameter in the order of one micrometer. They are curled, cut, carded and drawn in the known way to a diameter in the order of one millimeter and are then knitted up into a continuous cloth. During knitting tufts of similar fibers are grafted into the knitted stitches by means of needles. The fibers thus grafted on project from one side of the fabric and so constitute said fleece 12. A scratching operation is then applied to eliminate any grafted on fibers not properly attached to the substructure 11.

The average density of the resulting fleece is, for example, $8 \times 10^4$ fibers/cm$^2$.

The resulting textile is then in the known way subjected to a shearing operation so as to regularize the height of the fleece 12. The height may vary from $10^{-3}$ m to 0.05–0.06 m. To be more specific it is 0.03 m. For certain applications there is applied a so-called frizzing operation combining steam heat treatment at 120° C. and mechanical agitation. The effect of this treatment is to bunch together the hairs of the fleece in separate tufts.

In accordance with the invention, the manufacture of the support structure from the thus prepared cloth essentially comprises a cutting operation: in the case of the example shown in FIG. 2a this cutting produces a plurality of slits 13 parallel to the longitudinal axis along which the cloth is formed.

Uncut strips 14a–14b are provided between successive groups of slits 13. Thus in one specific application the cuts are 0.8 m long and the gap between the slits is 0.08 m.

A knitted and tufted textile cloth as described above is known to feature in its transverse structure a heterogeneity giving rise to differences in tension, the result of which is an inherent tendency for the cloth to roll up on itself on one side, in this instance the side of the substructure 11.

Figure 2C:
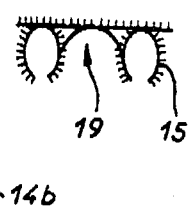
FIG. 2c is a view in cross-section on the line II—II in FIG. 2b.

Because of this phenomenon the two lips of each slit 13 move away from each other; the strip of textile between two adjacent slits rolls up upon itself and forms cylindrical sections 15 with the fleece on the convex side (see FIG. 2c).

There results an alternating arrangement of cylindrical elements 15 and openings 19.

The textile is then drawn, which tends to regularize the shape of the cylinders 15 obtained. These cylinders may be produced with a length of 1 m, for example. The textile 10 thus obtained is then subject to an enrichment operation, for example by a coating operation that may comprise immersion in a solution of sodium alginate charged with micro-organisms and with peptone intended to serve as a nutrient for the micro-organisms, an operation to make it insoluble by the application of a calcium salt, draining and drying for storage.

The supports prepared in this way are adapted to be placed without any further preparation into an effluent purification unit, for example.

As an alternative to what has been described (see FIGS. 3a, 3b) the cutting is discontinuous with fragmentary slits 16 still parallel to each other and to the longitudinal axis (X—X) of the cloth.

After rolling up each of the active areas of these slits there is obtained a structure featuring open areas 17 alternating with areas 18 covered with fleece on the outside.

Figure 3A:
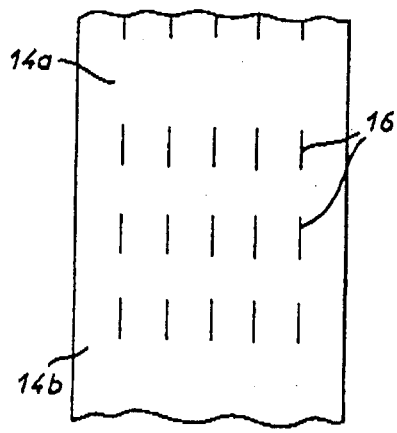
FIGS. 3a and 3b are views analogous to FIGS. 2a and 2b and respectively showing alternative ways of cutting and rolling.
Figure 3B:
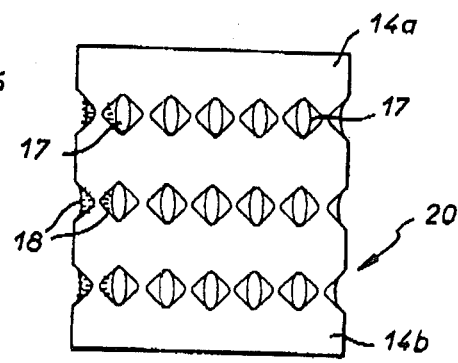

The structure thus obtained is in the form of a grid 20 (FIG. 3b).

In the embodiment of FIGS. 4a, 4b a plurality of sinusoidal slits 21 is formed cutting completely through one of the fixing strips 14a or 14b, according to the same phenomenon as previously.

The active areas of each slit roll up on themselves and the result is a plurality of helical structures 22. In the case under consideration each helical structure 22 is provided with a weight at its lower end 23 to hold it in position.

As an alternative to this, when it is the fixing strip 14a that is intersected by the slits 21, the free ends of the helical structures are fitted with flotation means (not shown).

The manufacturing method as previously described makes it possible to use all sorts of synthetic fibers (PVC, polypropylene, polyethylene, polyester, nylon), artificial fibers (viscose and the like) and natural fibers (coconut fiber, cellulose, etc).

The substructure 11 of the textile may be made by knitting, as previously described, or by tufting or weaving, or in non-woven form or in the form of any type of cloth that can be subjected to a rolling operation. In the case of a tufted or non-woven substructure, for example, the transverse heterogeneity required for the invention may be created or reinforced by appropriate incorporation of elastic strips or filaments suitably fixed into the structure. Such incorporation is carried out either during the creation of the substructure 11 of the textile or by sewing, binding or welding the filaments or strips to the finised textile, prior to cutting. The expression "continuous cloth" is to be understood as meaning not only a cloth proper with two strips extending over an unlimited length, but also an equally standard product of tubular or sheath form.

The fleece 12 obtained may be made in any appropriate manner:

The shearing of the fleece 12 is optional, and may be applied either uniformly or non-uniformly.

Thus in the example shown in FIG. 5, showing shearing to a semi-circular profile, active areas 24 of spherical shape are obtained after expansion.

The enrichment of the textile may also be achieved by other means than coating, for example by powdering with any appropriate substance such as clay, carbon, loam, freeze-dried living cells, etc or by bonding on a substance comprising the constituents to be fixed to it. Such enrichment may equally well be optional and not applied until the textile substrate is actually used. For enrichment by coating it is possible to use any appropriate type of solution or emulsion. In particular, peptone may be replaced by any appropriate nutrient medium.

The textile substrate in accordance with the invention has the advantage of necessitating only a limited number of manufacturing operations to shape it between the active areas of the openings which allow free circulation of the surrounding liquid, which reduced or eliminates the risk of clogging. Also, the active surface area of such textile substrates is extremely large since the expansion of the fleece 12 and its adherent surface area offer a considerable capacity for nidification and fixation of the active constituents.

In another typical application the present invention may serve to separate phases of a polyphase fluid (FIG. 6). To this end the textile used is of cylindrical shape stretched on a permeable drum 25 with a diameter of 1 m and a useful height of 1 m.

The textile cylinder is prepared in the way shown in FIGS. 3a so to form slits 16 which are 1 cm long spaced transversely and longitudinally relative to the axis X—X by 2 cm.

The length of the heirs of the fleece 12, approximately 4 cm, confers on them a covering power partly masking the open areas 17 when they are pressed against the surface of the substructure 11. This partial masking plays a mechanical filtering role improved by the biological properties of the textile. The drum 25 fitted with the substrate is disposed in a pool 26 containing activated sludge and intended for purifying effluent.

The cylinder is immersed to a depth of 0.80 m and rotated by a motor 27 with a peripheral speed in the order of 1 m/s. The treated liquid is extracted by means of a pump 28 immersed inside the cylinder.

This extraction causes a drop in the level 29 inside the drum relative to the pool and improves the application of the fleece 12 over the openings 17.

Cleaning may be carried out by causing a counterflow of fluid by stopping the pump and injecting water through the pipe 30 into the inside of the drum 25, or by changing the direction of rotation of the drum 25, or by centrifugal means by increasing the speed of the drum 25, or by modifying the physical, chemical and biological properties of the medium or by a combination of all or any of these methods.

Textiles manufactured in accordance with the present invention may be used in the most diverse fields of application, including:

purification of effluent,
production of drinkable water,
transformation of any organic liquor,
reclaiming of swampland,
separation of polyphase fluids, etc.

It is to be understood that the present invention is not limited to the embodiments chosen and shown; numerous alternative embodiments are within the competence of those skilled in the art without departing from the scope of the present invention; for example, the cuts may be of any shape and size.

There is claimed:

1. Textile substrate for bio-transformations and phase separations comprising a continuous cloth having on one of its sides a fleece defining an active surface for nidification and fixation of active constituents, said cloth having a heterogeneity of a kind to confer on said cloth an inherent tendency to roll up on itself, said cloth having a plurality of spaced apart parallel slits, the opposed edges of said slits tending to roll on themselves so as to produce enlarged orifices, said orifices defining liquid flow passages to avoid clogging of the cloth by active constituents and by products thereof in the course of bio-transformations and phase separations.

2. Textile according to claim 1, wherein the slit edges define cylindrical columns bearing said fleece on their convex surfaces.

3. Textile according to claim 1, wherein said slits are of sinusoidal shape, the portions of cloth between edges of adjacent slits taking on a helicoidal configuration.

4. Textile according to claim 1, wherein substantial portions of said side of the cloth bearing a fleece face outwardly from the other side of the cloth.

5. Textile according to claim 1, wherein said slits are about 0.8 m long and the gap between the slits is 0.08 m.

6. Textile according to claim 3, wherein said slits are about 0.01 m long and the gap between the slits is 0.02 m.

6. Textile according to claim 1, wherein said slits are the slits is between about 0.01 and 0.8 m.

7. Textile according to claim 1, wherein the length of extend substantially the entire length of the cloth.

8. Textile according to claim 1, wherein said slits tions of a polyphase fluid comprising a permeable rotatable drum, and a textile substrate of cylindrical shape stretched on the outside of said drum, said textile comprising a continuous cloth having on one of its sides fleece defining an active surface for nidification and fixation of active constituents, said cloth having a heterogeneity of a kind to confer on said cloth an inherent tendency to roll upon itself, said cloth having a plurality of spaced apart parallel slits, the opposed edges of said slits tending to roll on themselves so as to produce enlarged orifices, the length of the hairs of the fleece being long enough to partly mask said enlarged orifices so as to separate phases of the polyphase fluid upon rotation of the drum.

* * * * *